Sept. 22, 1964   J. CALDWELL   3,150,267
STEAM POWER PLANTS
Filed Dec. 31, 1962   3 Sheets-Sheet 1

Inventor:
John Caldwell
By: Stevens, Davis, Miller & Mosher
Attorneys

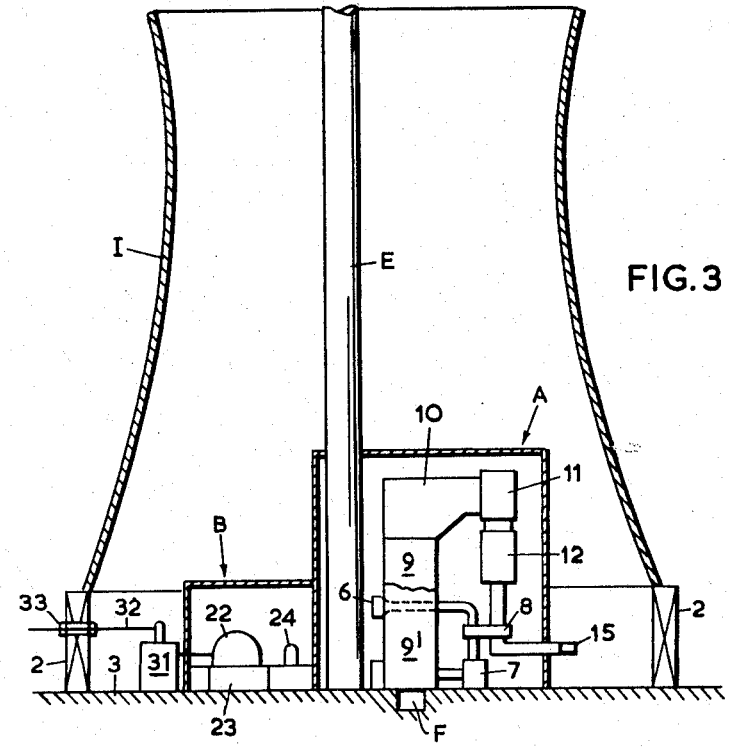
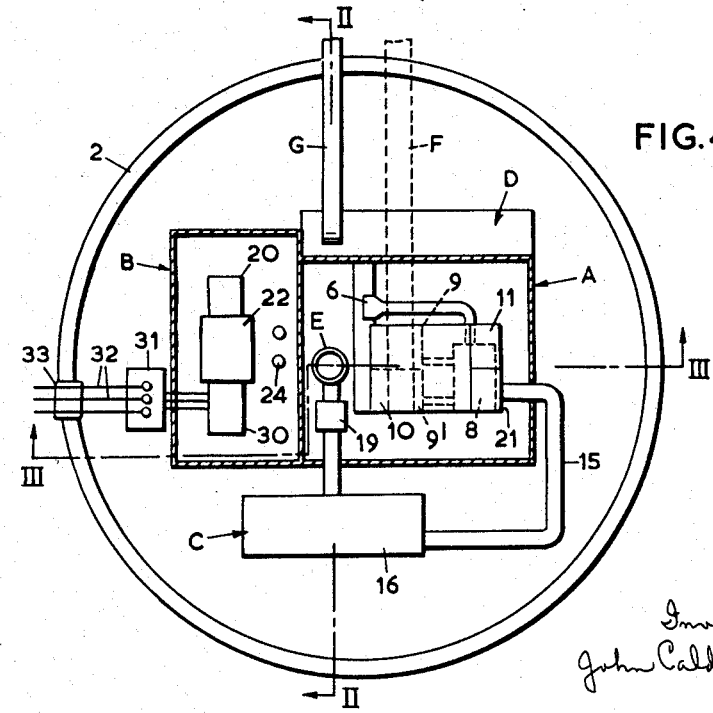

United States Patent Office 3,150,267
Patented Sept. 22, 1964

3,150,267
STEAM POWER PLANTS
John Caldwell, Rugby, England, assignor to The English Electric Company Limited, London, England, a British company
Filed Dec. 31, 1962, Ser. No. 248,505
Claims priority, application Great Britain Jan. 16, 1962
2 Claims. (Cl. 290—2)

The present invention relates to steam power plants.

According to the present invention, a steam power plant comprises a cooling tower having heat-exchanger means provided round the base of the cooling tower for the rejection of heat from the cooling fluid used for condensing the steam, and at least a substantial part of said power plant is arranged inside the cooling tower.

A typical embodiment of the invention will now be described by way of example with reference to the accompanying drawings of which:

FIG. 3 is a diagrammatic vertical section of the cooling tower on the line III—III of FIG. 4;

FIG. 4 is a plan view of the base of the cooling tower (FIGS. 2–4 being on a larger scale than FIG. 1)

Figure 1:
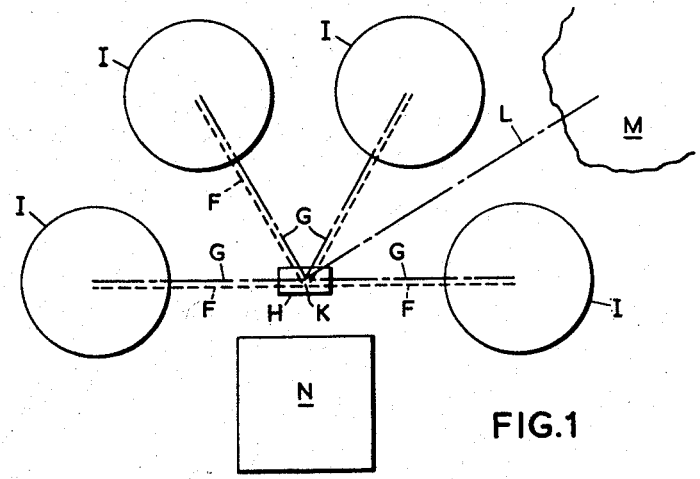
FIG. 1 is a plan view of a steam power plant including four cooling towers.
Figure 2:
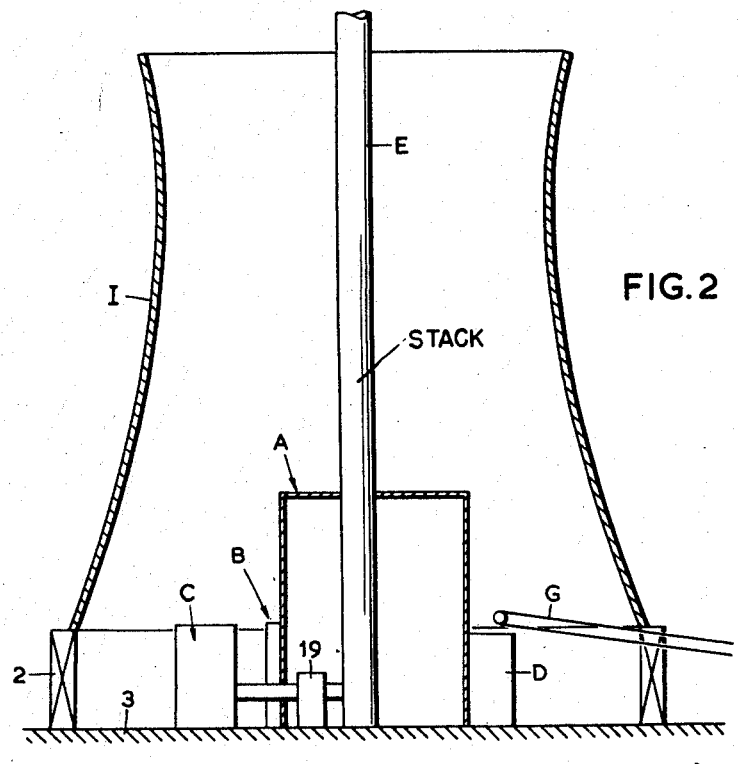
FIG. 2 is a diagrammatic vertical section of one of the cooling towers of FIG. 1 on the line II—II of FIG. 4.
Figure 5:
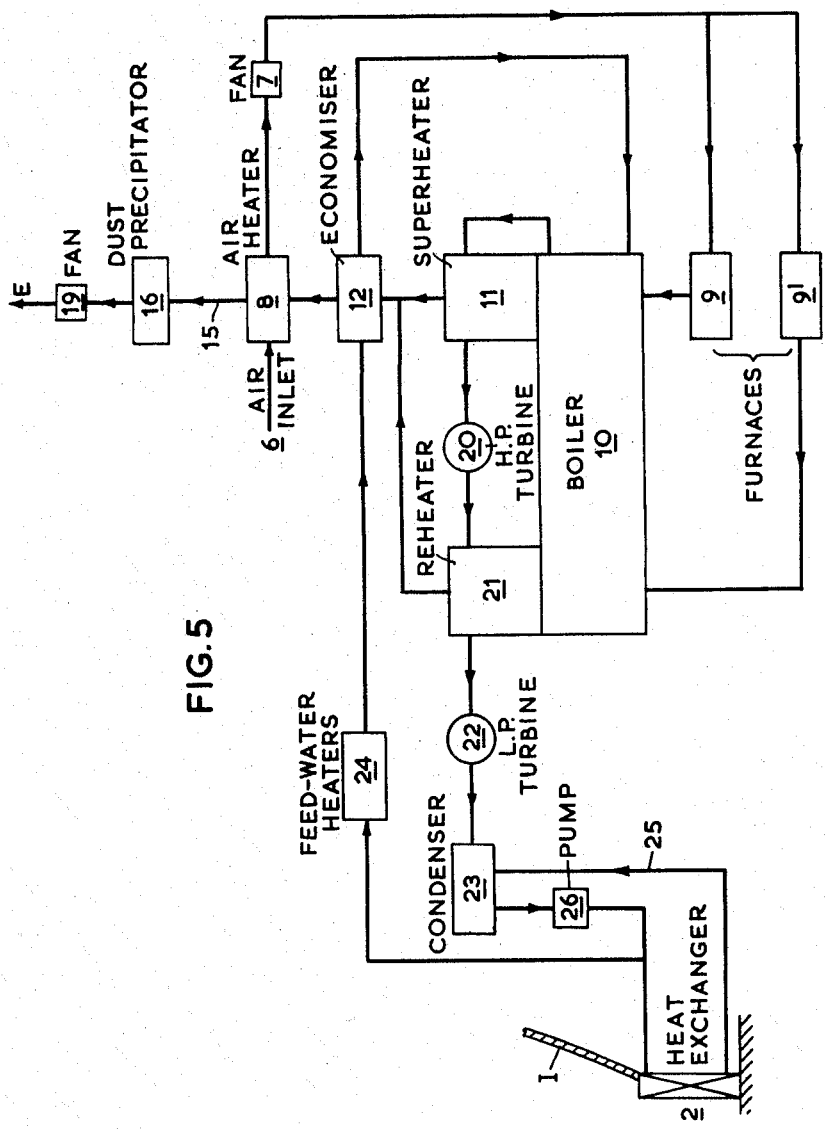
FIG. 5 is a block diagram of a unit of a steam power plant.

Referring firstly to FIG. 1, the steam power plant includes four cooling towers I, each of which forms a unit of the power plant and contains a boiler and turbine and other components, as will be described below. The cooling towers I are arranged in a circular arc around a central control room H and a coal receiving point K to which coal is conveyed from a coal store M by a conveyor L. Coal is supplied to each power plant unit from this central point K, by a conveyor G, and power produced by each power plant unit is transmitted by conventional means to an external switchgear yard N, and thence to the distribution system.

Referring now to FIGS. 2–5, a cooling tower I of conventional shape, and having a cylindrical air inlet at its base and a circular air outlet at the top, is mounted on a base 3. The cylindrical air inlet is occupied by radiators or heat exchangers 2, so that the draught induced through the cooling tower flows through the heat exchangers 2, the heated air being exhausted through the air outlet. In the power plant unit shown, the draught is produced by the natural chimney effect, but this may be assisted by fans or other means of providing a forced draught. The air flowing through the heat-exchangers 2 is in heat-exchange relation with water, which is circulated to the condensers of the power plant as will be described below.

Within the interior of the cooling tower I are located a boiler house A containing a boiler and its auxiliaries, a turbine-house B containing a turbo-generator and its auxiliaries, a dust precipitator plant C, a coal and ash plant D, and a chimney E. The radiators 2 at the base of the cooling tower may be arranged in a circle or a polygon.

Coal is supplied to the coal and ash plant D by an overhead conveyor G, and ash is removed from the said coal and ash plant D by an underground conveyor or pipe F. The coal and ash plant D serves the furnaces 9, 9'.

Combustion air for the furnaces is aspirated through an air inlet 6, if desired at a higher level in the interior of the cooling tower I where the temperature is higher, and is supplied by a forced draught fan 7, after being preheated in the air heater 8, to the furnaces 9, 9'. The gases from furnace 9 heat the boiler 10 and the superheater 11; those from furnace 9' heat the boiler 10 and a reheater 21 for the steam; the gases then flow together through the economiser 12 and air heater 8 and issue into a duct 15 leading the flue gases to the dust precipitators 16 in the dust precipitator plant C, from where they are discharged through a forced draught fan 19 into the stack E.

Steam from the boiler 10 passes to the superheater 11 and then to the high-pressure turbine 20, back to the reheater 21, and thence to the low-pressure turbine 22, the latter discharging into a condenser 23. Feed water heaters 24 preheat the feed water from the condenser before the same is supplied to economiser 11 and to the boiler 10.

Cooling water for the condenser 23, where it is sprayed into the steam exhausted from the low-pressure turbine 22, is circulated from the condenser, by means of pump 26, through culverts 25 to the heat-exchangers 2, where heat is rejected to the air which flows through the cooling tower, and thence the cooling water passes back to the condenser.

Electric current generated by the alternator 30 driven by the turbines 20, 22 is supplied to a transformer 31 outside the power house B but within the cooling tower I, and hence by power lines 32 through insulators 33 to the external switchgear N (FIG. 1), and to the distribution system.

What I claim as my invention and desire to secure by Letters Patent is:

1. An electrical generating plant comprising a cooling tower having a first opening at the top, and a second opening around the base, thereof, a steam turbine within the cooling tower, steam-generating means disposed within the cooling tower and connected so as to supply steam to said steam turbine, an electrical generator coupled to said steam turbine, a water-cooled condenser disposed within the cooling tower and connected to said steam turbine for condensing exhaust steam therefrom, indirect heat exchange means disposed in said second opening, and connecting means connecting said condenser with said indirect heat exchange means so as to allow circulation of condenser cooling water in a closed circuit through said condenser and said indirect heat exchange means, whereby said cooling water is cooled by air flow passing consecutively through said second and first openings.

2. An electrical generating plant comprising a cooling tower having a first opening at the top, and a second opening around the base, thereof, a steam turbine within the cooling tower, steam-generating means disposed within the cooling tower and connected so as to supply steam to said steam turbine, an electrical generator coupled to said steam turbine, a transformer disposed within said cooling tower and connected to said electrical generator, electric power lines connected to said transformer and passing from the inside of said cooling tower to the outside thereof so as to transmit away from the cooling tower electric power generated by said electrical generator, a water-cooled condenser disposed within the cooling tower and connected to said steam turbine for condensing exhaust steam therefrom, indirect heat exchange means disposed in said second opening, and connecting means connecting said condenser with said indirect heat exchange means so as to allow circulation of condenser cooling water in a closed circuit through said condenser and said indirect heat exchange means, whereby said cooling water is cooled by air flow passing consecutively through said second and first openings.

References Cited in the file of this patent

UNITED STATES PATENTS

| | | |
|---|---|---|
| 2,079,923 | Pavlecka | May 11, 1937 |
| 2,368,755 | Falardeau | Feb. 6, 1945 |

FOREIGN PATENTS

| | | |
|---|---|---|
| 420,413 | Great Britain | Nov. 30, 1934 |
| 875,611 | Great Britain | Aug. 23, 1961 |
| 935,010 | Germany | Nov. 10, 1955 |